US008972925B2

(12) United States Patent
Goldman et al.

(10) Patent No.: US 8,972,925 B2
(45) Date of Patent: Mar. 3, 2015

(54) TRACKING APPLICATION DEVELOPMENT AND DISTRIBUTION

(75) Inventors: Oliver Goldman, Los Altos, CA (US); Michael Chou, Los Altos, CA (US); Arno Gourdol, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 301 days.

(21) Appl. No.: 13/118,230

(22) Filed: May 27, 2011

(65) Prior Publication Data

US 2013/0167105 A1  Jun. 27, 2013

(51) Int. Cl.
G06F 9/44 (2006.01)

(52) U.S. Cl.
USPC .......................................... 717/101

(58) Field of Classification Search
USPC .......................................... 717/101
See application file for complete search history.

(56) References Cited

U.S. PATENT DOCUMENTS

| | | | | |
|---|---|---|---|---|
| 5,761,686 | A * | 6/1998 | Bloomberg | 715/234 |
| 5,825,883 | A * | 10/1998 | Archibald et al. | 705/53 |
| 6,233,684 | B1 * | 5/2001 | Stefik et al. | 713/176 |
| 7,349,553 | B2 * | 3/2008 | Rodriguez | 382/100 |
| 7,386,872 | B2 * | 6/2008 | Shimizu | 725/105 |
| 7,526,733 | B1 * | 4/2009 | Samson | 715/805 |
| 7,962,500 | B2 * | 6/2011 | Van Zwol et al. | 707/758 |
| 8,015,410 | B2 * | 9/2011 | Pelly et al. | 713/176 |
| 8,180,098 | B2 * | 5/2012 | Kalker | 382/100 |
| 2002/0059460 | A1 * | 5/2002 | Ishida et al. | 709/246 |
| 2002/0116382 | A1 * | 8/2002 | Koyama et al. | 707/9 |
| 2002/0120634 | A1 * | 8/2002 | Min et al. | 707/200 |
| 2002/0168082 | A1 * | 11/2002 | Razdan | 382/100 |
| 2004/0213458 | A1 | 10/2004 | Kanatsu | |
| 2005/0066181 | A1 | 3/2005 | Burns | |
| 2006/0041591 | A1 * | 2/2006 | Rhoads | 707/104.1 |
| 2007/0033146 | A1 * | 2/2007 | Hollar | 705/57 |
| 2007/0240152 | A1 * | 10/2007 | Li et al. | 717/174 |
| 2008/0172747 | A1 * | 7/2008 | Hurtado et al. | 726/26 |
| 2009/0070675 | A1 * | 3/2009 | Li | 715/716 |
| 2009/0299858 | A1 * | 12/2009 | Landry | 705/14.69 |
| 2009/0319904 | A1 * | 12/2009 | Rensin et al. | 715/733 |

FOREIGN PATENT DOCUMENTS

JP  2006047147 A  2/2006

OTHER PUBLICATIONS

Czerwinski et al., "Digital Music Distribution and Audio Watermarking", University of California, Berkeley, Jun. 1999.*

(Continued)

*Primary Examiner* — Wei Zhen
*Assistant Examiner* — Junchun Wu
(74) *Attorney, Agent, or Firm* — Wolfe-SBMC (57) ABSTRACT

Methods, systems, and apparatus, including computer programs encoded on a computer storage medium, for tracking development and distribution of software applications. In general, one innovative aspect of the subject matter described in this specification can be embodied in methods that include the actions of: identifying a software application available from a software application distribution system; retrieving at least image data from an image file, which is associated with the software application, from the software application distribution system without retrieving the software application; detecting a watermark in the image data; and storing information associating the detected watermark with the software application distribution system from which the identified software application is available.

20 Claims, 4 Drawing Sheets

(56) References Cited

OTHER PUBLICATIONS

Liu et al., "Digital Rights Management for Content Distribution", Australian Computer Society, 2003.*

Cox et al., "Some General Methods for Tampering with Watermarks", IEEE, May 1998, vol. 16, No. 4.*

Peter Meerwald, "Brief Description of some watermarking algorithms", http://www.cosy.sbg.ac.at/~pmeerw/Watermarking/algos.html, last update Dec. 15, 2005, printed from web Apr. 18, 2011, 8 pages.

All Al-Haj, "Combined DWT-DCT Digital Image Watermarking", Journal of Computer Science 3(9): 740-746, 2007.

Author Unknown, Update Check—Digimarc, https://www.digimarc.com/DigimarcForImages/update.asp, printed from web Apr. 6, 2011, 2 pages.

Wikipedia, "Digital watermarking", http://en.wikipedia.org/wiki/Digital_watermarking, printed from web Apr. 6, 2011, 8 pages.

* cited by examiner

TRACKING APPLICATION DEVELOPMENT AND DISTRIBUTION

BACKGROUND

This specification relates to tracking development and distribution of software applications, such as mobile apps created for smart phones.

Software applications are often made available for purchase over the Internet, such as through the World Wide Web. Typically, some information concerning each software application is made available free of charge, for example, in order to assist users in determining whether or not the software application would be useful for them on the computing device(s) for which the software applications is intended. Such information includes information that is readily visible when visiting a website, as well as information that may require some extra steps to get access to it without having to purchase or download the software application itself More-over, such information can be valuable to other parties, such as companies that want to compile information regarding many software applications available from multiple different software application distribution systems (e.g., the APPLE® APP STORE or the ANDROID® MARKET). Various companies regularly access such information from the various software application distribution systems, such as by using web scraping techniques, accessing an application program interface (API) provided by a particular software application distribution system, or downloading particular files associated with the software applications.

SUMMARY

This specification describes technologies relating to tracking development and distribution of software applications, such as mobile apps created for smart phones. In general, one innovative aspect of the subject matter described in this specification can be embodied in methods that include the actions of: adding, to an image file associated with a software application, metadata indicating a software tool used to develop the software application; and providing the software application and image file to a computer system to cause the software application to be made available for distribution from a software application distribution system including at least one server computer including a processor and a memory device; wherein at least a portion of the image file including the added metadata is made available by the software application distribution system for retrieval separate from the software application and without a restriction imposed by the software application distribution system for retrieval of the software application, and wherein the added metadata is retrievable from the portion of the image file. Other embodiments of this aspect include corresponding systems, apparatus, and computer programs, configured to perform the actions of the methods, encoded on computer storage devices.

These and other embodiments can each optionally include one or more of the following features. The adding can include applying a digital watermark, which includes the metadata, to image data in the image file. The image file can be an icon image file including multiple icon images that graphically represent the software application, and the applying can include applying the digital watermark to at least one of the multiple icon images. The image file can be a screen shot of the software application in operation. Moreover, the image data can be from one of multiple discrete sets of image data, and the adding can include: identifying the discrete sets of image data; and selecting the one of the discrete sets of image data for the applying.

The methods that include the actions of: receiving, at an application distribution tool, the software application and image file in a package from an application development tool; wherein the adding is performed by the application distribution tool on the received package to form a modified package; and wherein the providing includes transmitting the modified package to the software application distribution system including the computer system. The software tool can include a packaging tool, and the methods can include: receiving, at the packaging tool, components of the software application; and converting, by the packaging tool, the components of the software application to a package format associated with the software application distribution system; wherein the applying includes applying the digital watermark to the image data in the image file to identify the packaging tool via the applied watermark.

The packaging tool can perform the applying. The adding can include adding to the image file metadata indicating multiple software tools used to develop the software application. In addition, the methods can include the acts of: identifying the software application available from the software application distribution system; retrieving the image data including the digital watermark from the software application distribution system without retrieving the software application; detecting the digital watermark in the image data; and storing information associating the detected watermark with the software application distribution system from which the identified software application is available.

In general, another aspect of the subject matter described in this specification can be embodied in methods that include the actions of: identifying a software application available from a software application distribution system; retrieving at least image data from an image file, which is associated with the software application, from the software application distribution system without retrieving the software application; detecting a watermark in the image data; and storing information associating the detected watermark with the software application distribution system from which the identified software application is available.

These and other embodiments can each optionally include one or more of the following features. The retrieving can include scraping data from a web page provided by the software application distribution system. The storing can include storing information indicating a software tool used to develop the software application, wherein the detected watermark includes the information indicating the software tool. The storing can also include storing information indicating multiple software tools used to develop the software application, wherein the detected watermark includes the information indicating the software tools. Moreover, the image file can be an icon image file, and the detected watermark can include information indicating a tool setting, software version information, an OS platform, or a software features used by an application developer.

In general, another aspect of the subject matter described in this specification can be embodied in a computer storage medium encoded with a computer program, the program including instructions that when executed by data processing apparatus cause the data processing apparatus to perform operations of the methods, the instructions including instructions to perform the actions described and claimed. Moreover, another aspect of the subject matter described in this specification can be embodied in a system including an interface to a communication network; a data repository; and processor means for tracking development and distribution of software applications based on digital watermarks detected in image data of image files associated with the software applications, the image data being accessible through the interface to the communication network, the image data being provided by one or more software application distribution systems separate from the software applications available from the one or more software application distribution systems, and the data repository recording output of the means for tracking development and distribution. The processor means can include a computer system that includes the data repository. The interface can include a network interface card. The image files can include icon image files, screen shot image files, or both.

Particular embodiments of the subject matter described in this specification can be implemented so as to realize one or more of the following advantages. A digital watermark can be applied to one or more icons (or image data of other image files) associated with an application. This can happen when an application is packaged for deployment, such as in a .ipa file for upload to the APPLE® APP STORE or in a .apk file for the ANDROID® MARKET. Later, the application icon(s) (or the image data of the other image files) can be searched for this watermark. Presence of the watermark can indicate which tool was used to create the application, e.g., an ADOBE® software development tool as opposed to another party's software development tool. By applying the watermark to the same icon (or other freely available image data) that is displayed by (or otherwise made available from) the software distribution system, detection can be performed without the need to download the software application itself. This can provide a technique for tracking application development and distribution that is both difficult to detect and robust since, if the watermark is not visible, it won't be found unless someone specifically looks for a watermark in the icons (or other image file data), and manipulating the application package and even the icon (or other image file data) will generally not destroy the watermark. Moreover, by applying the watermark(s) automatically by the development tool used in the application development process, the tracking information can be placed and later found in a manner that is transparent to the application developer, the application distributor, and the end user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
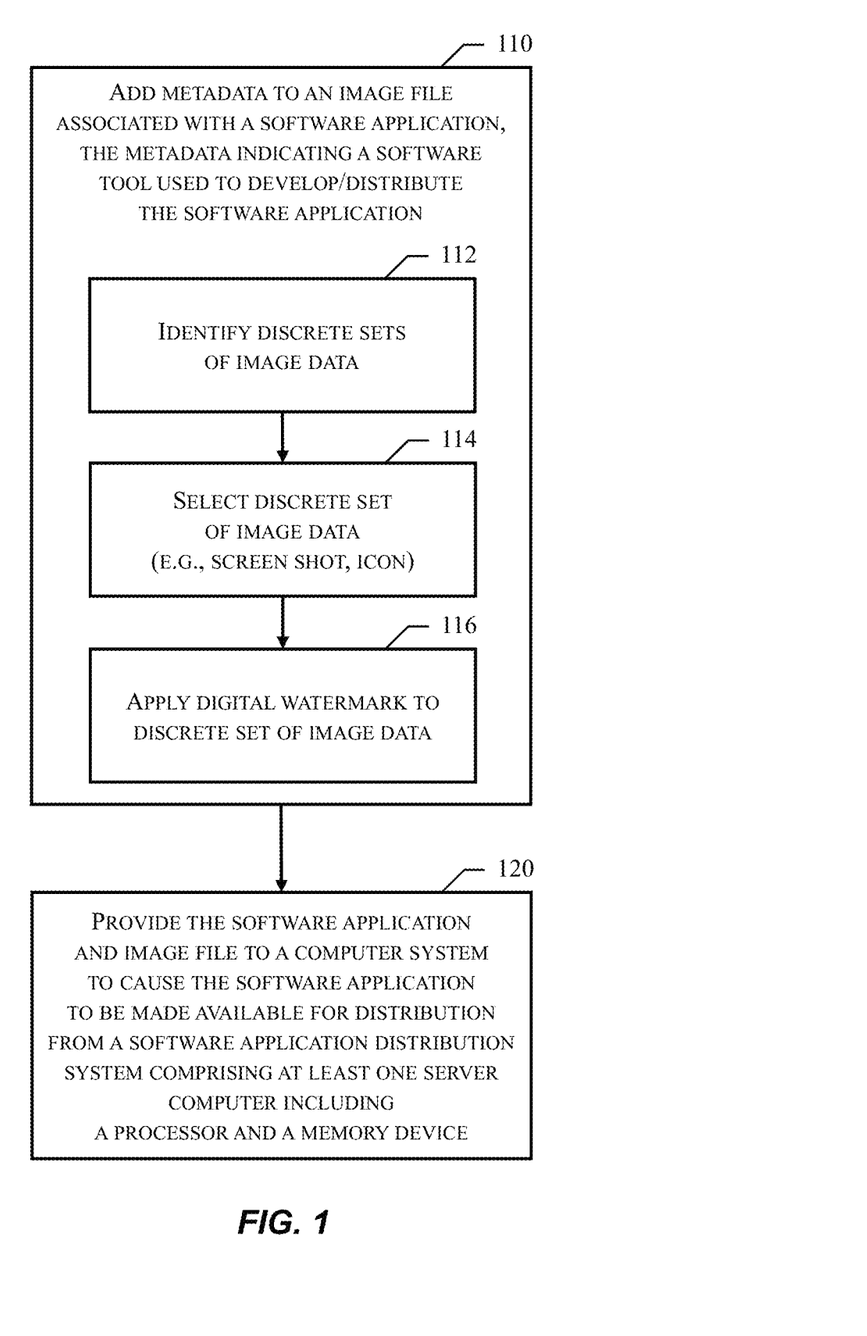
FIG. 1 is a flowchart showing a process of linking a software application with a software development tool such that the link is readily discoverable.

FIG. 1 is a flowchart showing a process of linking a software application with a software development tool such that the link is readily discoverable. Metadata is added 110 to an image file associated with a software application. The metadata can indicate one or more software tools used to develop the software application. The metadata can include data that directly describes the development tool, data that refers to a record stored in another location, e.g., a database maintained by the provider of the software development tool or by a third party, where that record describes the development tool, or a combination of these. Moreover, in some implementations, the watermark need not do either of these, but can simply be a predefined set of data associated with a software development tool, where the mere presence of this predefined set of data indicates the software development tool was used.

The metadata can be added to a portion of the image file that is used for information other than image data. This can include modifying existing metadata in the image file to encode the new metadata being added. Alternatively, or in addition, the metadata can be added to image data in the image file, such as by applying a digital watermark, which includes the metadata, to the image data in the file (i.e., to some or all of the image data in the file).

In some implementations, for example, adding 110 the metadata includes the following. First, discrete sets of image data can be identified 112. This can include identifying different image files associated with the software application (e.g., an icon image file and a screen shot image file), identifying different portions of a given image file (e.g., icon images of different resolutions contained in a single icon image file), or identifying different portions of a given image definition (e.g., Red (R), Green (G) and Blue (B) data subsets of an RGB image). Then, one or more of the discrete sets of image data can be selected 114 for the applying of the digital watermark. For example, either an icon image file or a screen shot image file can be selected based on availability of such files and/or the amount of image data available in such files in which the digital watermark can be encoded. As another example, one or more specific images in an image file (e.g., a largest icon image in an icon image file) can be selected for application of the digital watermark. In general, a determination can be made regarding which images will be available for downloading later, such that one or more of those images can be watermarked, watermarking more of the images can improve the chances of later detecting the watermark, and various rules or heuristics can be used to determine which images are best suited to hiding a watermark (e.g., larger and noisier images are typically better choices for hiding a digital watermark therein).

Finally, the digital watermark can be applied 116 to the selected set(s) of image data. The watermark can be such that it is not readily perceived as being present in the image (i.e., an "invisible" digital watermark). The watermark can be applied to pixel data of the image to alter the data in a way that can be detected electronically, but is not readily visible to a human when the image is rendered to a computer screen. Different algorithms can be used for this, and some of these can do it such that it is difficult to detect the presence of the watermark without knowing the algorithm used. Such algorithms can employ Discrete Cosine Transform (DCT) and Discrete Wavelet Transform (DWT) domain algorithms. Moreover, as will be appreciated, and as described further below, more than one watermark can be added, including potentially adding one or more digital watermarks to multiple distinct and separate image files.

The software application and image file are provided 120 to a computer system to cause the software application to be made available for distribution from a software application distribution system. This can involve transmitting the software application and image file to a packaging tool or application distribution tool operating on the computer system, where that tool then transmits the software application and image file to the software application distribution system from which it can be accessed/purchased by users. Alternatively, this can involve transmitting the software application and image file directly to the software application distribution system. Note that transmitting the software application and image file to the software application distribution system can include transmitting these in the form of an application package with the image file included in the package along with the software application, or in the form of an application package with the image file not being in the package but rather uploaded in reference to the same application as the package.

In any case, at least a portion of the image file including the added metadata is made available by the software application distribution system for retrieval separate from the software application and without a restriction imposed by the software application distribution system for retrieval of the software application. This restriction can include a requirement of software application purchase, membership/sign-up with the software application distribution system, or provision of user information (e.g., a name and email address, which can be resold and used for marketing purposes). The image file (or at least the portion thereof with the metadata included) can then be made publicly available by the software application distribution system, and the watermark with the metadata will be readily retrieval therefrom.

Figure 2A:
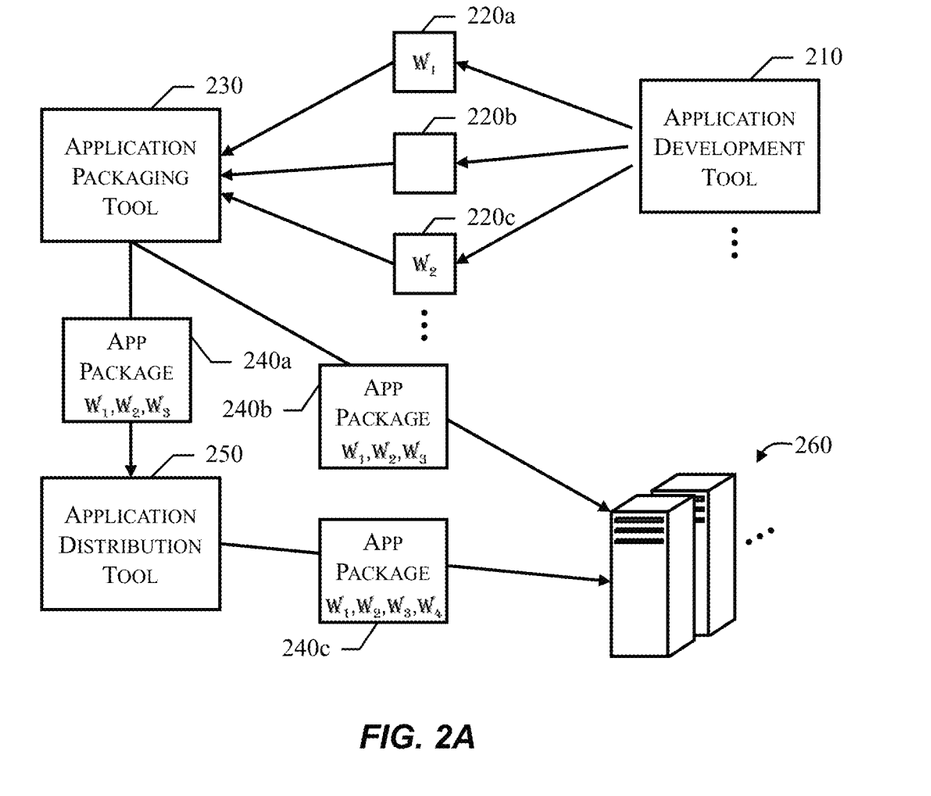
FIG. 2A is a block diagram showing a workflow for application development and distribution, including various options for adding a digital watermark to track application development and distribution.

FIG. 2A is a block diagram showing a workflow for application development and distribution, including various options for adding a digital watermark to track application development and distribution. Various application development tools 210 can be used to create components 220 of a software application. Such application development tools 210 can include application building tool used for building mobile, web, and desktop applications (e.g., ADOBE® FLASH® BUILDER® software, available from Adobe Systems Incorporated of San Jose, Calif.), interactive project development tools (e.g., ADOBE® FLASH® CATALYST® software, available from Adobe Systems Incorporated of San Jose, Calif.), interactive content authoring tools (e.g., ADOBE® FLASH® PROFESSIONAL® software, available from Adobe Systems Incorporated of San Jose, Calif.), web authoring tools (e.g., ADOBE® DREAMWEAVER® software, available from Adobe Systems Incorporated of San Jose, Calif.), content creation tools for help systems, policies and procedures, and professional knowledgebases (e.g., ADOBE® ROBOHELP® software, available from Adobe Systems Incorporated of San Jose, Calif.), and web application integrated development environments (IDEs) (e.g., Aptana® software available from Aptana, Inc. of San Mateo, Calif.).

For example, a first tool 210 can add a first digital watermark, $W_1$, to a component 220a, such as an icon image for the software application. In addition, a second tool 210 can add a second digital watermark, $W_2$, to a component 220c, such as a screen shot image for the software application, which can show the software application in operation. Other components 220, such as a component 220b, will have no watermarks added. In some implementations, the components 220 can include binary executable code, byte codes, scripts, images, sound recordings, videos, text documents, Hypertext Markup Language (HTML) documents, Extensible Markup Language (XML) documents, and other types of computer files and documents.

The components 220 of the software application are then typically received and combined by an application packaging tool 230 to form an application package. This can involve converting the components 220 to a package format associated with the software application distribution system. For example, in the context of apps for smart phones, the application files can be separately packaged into a .ipa file for the APPLE® APP STORE and a .apk file for the ANDROID® MARKET. Moreover, this converting can include translating individual components 220 from one format to another, such as converting an icon to a different format, where the digital watermark can be applied to the converted version of the icon (or more generally, the digital watermark can be applied to a derivative of an original image). For further details of example processes for package creation, see U.S. Patent Pub. No. 2008/0127170, U.S. Pub. No. 2008/0127169, and U.S. patent application Ser. No. 11/773,884, each of which is hereby incorporated by reference.

Note that the packaging tool 230 can be an example of an application development tool 210. Thus, the packaging tool 230 can add its own digital watermark, $W_3$, to the application package. This can include adding the watermark to one of the components 220, either before or after packaging, and this watermark, $W_3$, can be a third (or higher number) watermark, or it can be the first digital watermark added (when the application development tools 210 do not add the digital watermarks $W_1$ and $W_2$).

Figure 2B:
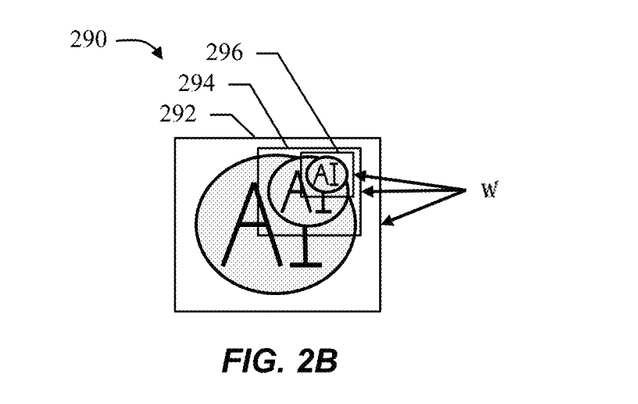
FIG. 2B is a diagram showing a digital watermark being added to one or more images of an icon for a software application.

In some implementations, during the packaging operation, the digital watermark is applied to one or more of the icon images. The best icon image to choose can depend on how a target application distribution system 260 operates. For example, FIG. 2B is a diagram showing a digital watermark, W, being added to one or more icon images 292, 294, 296 of an icon file 290 for a software application. Among the files that make up an application are one or more icons, where an icon image file can include multiple icon images that graphically represent the software application. The image file can include multiple images having different sizes and color depths. These icons are used to represent the application in the application distribution system 260, on the device on which the application is installed, and so forth. These icons are called out in the package formats via various means so that the application distribution system 260 and the devices can find them. They are therefore also called out at the time at which the package is created, so that the packaging tool can store them in the correct location in the package, using the correct name, and so on.

As shown in FIG. 2B, the watermark, W, can be applied to all of the images 292, 294, 296 (only three images are shown, but an icon file can include more or fewer icon images) or to a proper subset of the images 292, 294, 296 (e.g., only to the largest icon image 292). Moreover, the digital watermark can embed information into the icon image in such a way that it's visually difficult to detect (in accordance with known watermarking techniques) and yet the information can be readily retrieved later, even if the image has been manipulated in certain ways. In some implementations, one or more images can be chosen for application of one or more digital watermarks based on whether an image will be available for download later and the suitability of the image for application of the watermark (e.g., larger and noisier images are typically better).

Referring again to FIG. 2A, each of the individual application development tools 210, including the application packaging tool 230, can be a program running on a respective, distinct computer system. Alternatively, various subsets of the application development tools 210, and potentially including the application packaging tool 230, can be combined into one or more programs running on one computer system. Moreover, each computer system can be a single computer with processor(s) and memory device(s) or a set of interconnected computers that operate together, such as a network of computers used by a software developer.

The application package generated by the application packaging tool 230 can be a package 240b sent directly to an application distribution system 260 (sent by the tool 230 or by the user of the tool 230). Alternatively, the application package generated by the application packaging tool 230 can be a package 240a sent to an application distribution tool 250, which handles sending the application package to multiple different application distribution systems, including the application distribution system 260. The application distribution tool 250 can perform various functions, including potentially adding its own digital watermark, $W_4$, to the application package 240a to form a modified application package 240c that is sent to the application distribution system 260. This can include adding the watermark to one of the components 220, and this watermark, $W_4$, can be a second or third (or higher number) watermark, or it can be the first digital watermark added (when the application development tools 210 do not add the digital watermarks $W_1$, $W_2$, and $W_3$). For example, the packaging tool 230 can add a first watermark to an icon image, and the distribution tool can add a second watermark to a screen shot image. Moreover, when multiple watermarks are added, they can be added to the same component (e.g., four different watermarks added to the same screen shot image).

When the application distribution system 260 receives an application package, the application distribution system 260 can disassemble the package and retrieve the icon(s) (and other components). The icon(s) (and potentially other components) can then be displayed in the website of the application distribution system 260 when that specific application is viewed, or otherwise be made available (e.g., through an API). Thus, the watermark(s) are made available for the one or more providers of one or more tools 210, 230, 250 to detect and record which tool(s) were used in the creation of the application being made available by the application distribution system 260.

Figure 3:
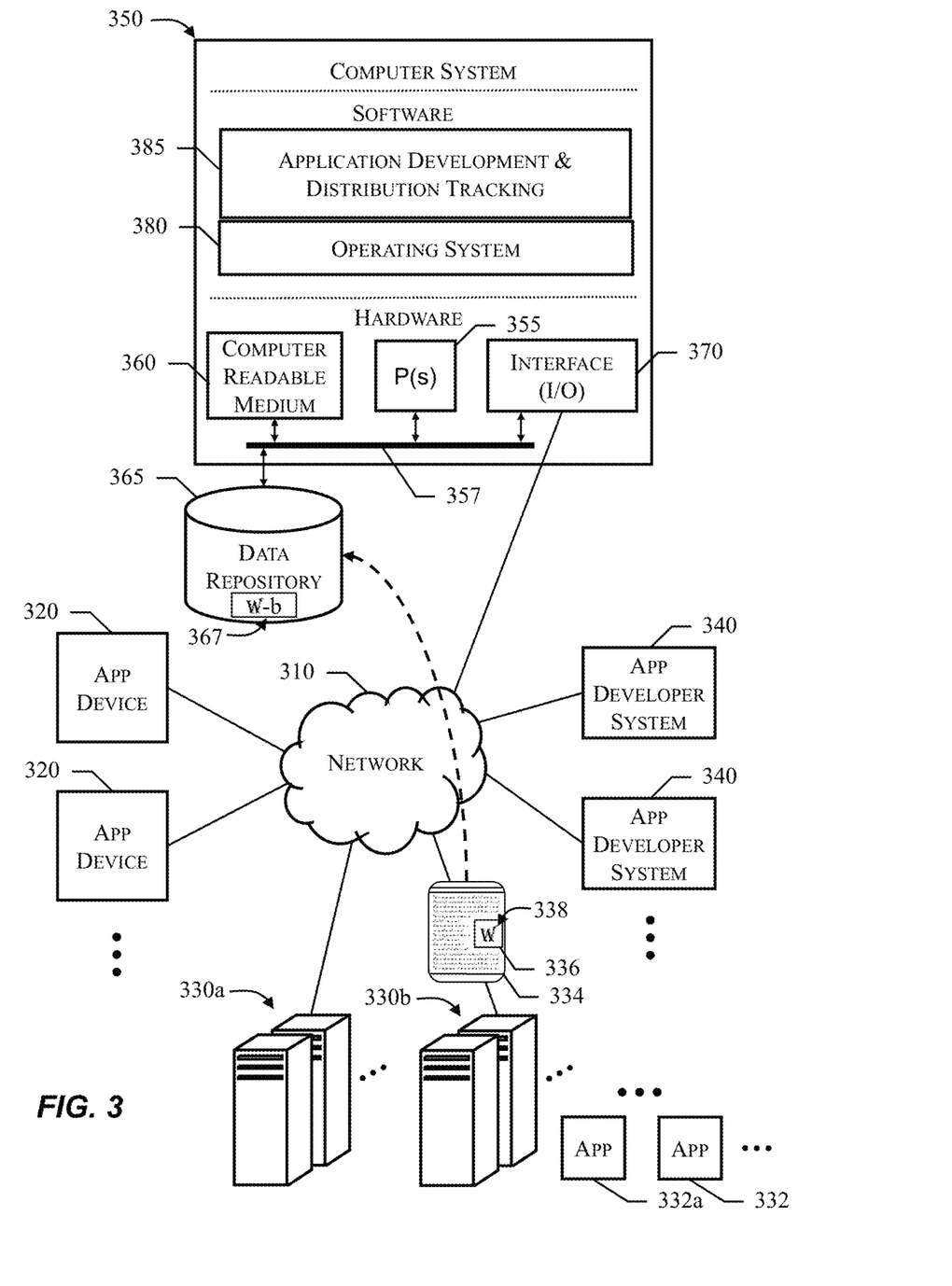
FIG. 3 is a block diagram showing a system in which a digital watermark is detected for a software application and this detection is associated with the software application distribution system from which the software application is available.

FIG. 3 is a block diagram showing a system in which a digital watermark is detected for a software application and this detection is associated with the software application distribution system from which the software application is available. A communication network 310 provides a mechanism by which multiple different computing systems can communicate with each other. The network 310 can include local area networks (e.g., an Ethernet network), wide area networks (e.g., a campus or city computer network), public or private networks (e.g., an enterprise network), wired or wireless networks (e.g., a mobile phone network), inter-networks (e.g., the Internet), virtual private networks (VPNs), or a combination of these.

A computer system 350 is communicatively coupled with the network 310 and includes hardware and software. The hardware includes an interface 370, a processing device 355, a computer-readable medium 360, and a system bus 357 to connect them, all of which can, in some implementations be integrated on a single circuit board. The system bus 357 can include multiple different types of busses, such as parallel or serial busses. The computer-readable medium 360 can include one or more non-volatile memories and storage devices (e.g., Flash memory and a hard disk), one or more volatile memory devices (e.g., dynamic or static random access memory), or a combination of these. Moreover, in some implementations, the hardware of the computer system 350 can also include a data repository 365, which can be included the computer-readable medium 360. Alternatively, the data repository 365 can be an externally located device or system (e.g., a database system, which can be accessed through the network 310 in some implementations).

The processing device 355 can include one or more microprocessors and/or multicore processors. The interface 370 can include different types of interface circuitry and devices, such as a network card, or a radio frequency (RF) section and antenna, to connect to the network 310. The interface 370 can also include other types of interface devices such as input/output (I/O) devices used to connect with other components, such as a keyboard, a cursor moving device, speaker(s), a microphone, and a digital camera, each of which can also be included in the hardware of the computer system 350.

Application devices 320 and application developer systems 340 can also be communicatively coupled with the network 310 and include hardware and software. This hardware can include one or more of the hardware devices described above for the computer system 350, and at a minimum includes at least one processor, at least one memory device, and at least a network interface, for each computing device or system. For example, in some implementations, the application developer systems 340 are each multiple computers connected by an enterprise network, the application devices 320 (where the software applications 332 being tracked can be installed) are smart phones, and the computer system 350 is a single computer.

Other configurations and implementation scenarios will be apparent to those of ordinary skill in the art. Likewise, as will be appreciated, the software application distribution systems 330 each include at least one server computer including one or more processors (not shown) and one or more memory devices (not shown). Each software application distribution system 330 can include a server cluster or server farm, where the server computers can be located in the same general location (e.g., a specific building) or can be distributed across a wide area (e.g., across the United States and connected by the Internet).

The computer system 350 includes an operating system 380 and an application development and distribution tracking program 385. The program 385 can be built into the operating system 380, can run on top of the operating system 380 (as shown), or can run in a runtime environment that provides the program 385 with access to the functions provided by the operating system 380. The program 385 can contact different software application distribution systems 330a, 330b to look for applications that have a detectable watermark in one of their freely available elements. This can involve accessing an API of each respective software application distribution system and/or performing web scraping. For example, since the watermarked icon becomes part of the web page at the software application distribution system, it can also be downloaded during a scraping process. All scraped icons can be inspected for the watermark. If the watermark is present, it indicates that the application was created using the tool corresponding to the detected watermark.

Thus, the program 385 can detect a watermark 338 in an image 336 available through a web page 334 of the software application distribution system 330b by programmatically visiting the web pages associated with each application 332 and recording information about the respective applications. At a minimum the recorded information can include information associating the detected watermark 338 with the software application distribution system 330b from which a particular software application 332a is available, thus indicating that the watermark 338 was found at the software application distribution system 330b. Such information, as well as additional information gleaned from the watermark 338 or other data associated therewith or with the particular software application 332a, can be stored in a record 367 in the data repository 365. Moreover, the information can be acquired without downloading the application 332a, which might cost money.

Furthermore, it will be appreciated that the computer system 350 can represent multiple computer system operating together. For example, in some implementations, the program 385 can be designed to execute across a set of multiple, separate computers. This can result in performance (e.g., increased speed) for the overall process of accessing (e.g., scraping) the different software application distribution systems 330a, 330b to detect previously applied watermarks.

Figure 4:
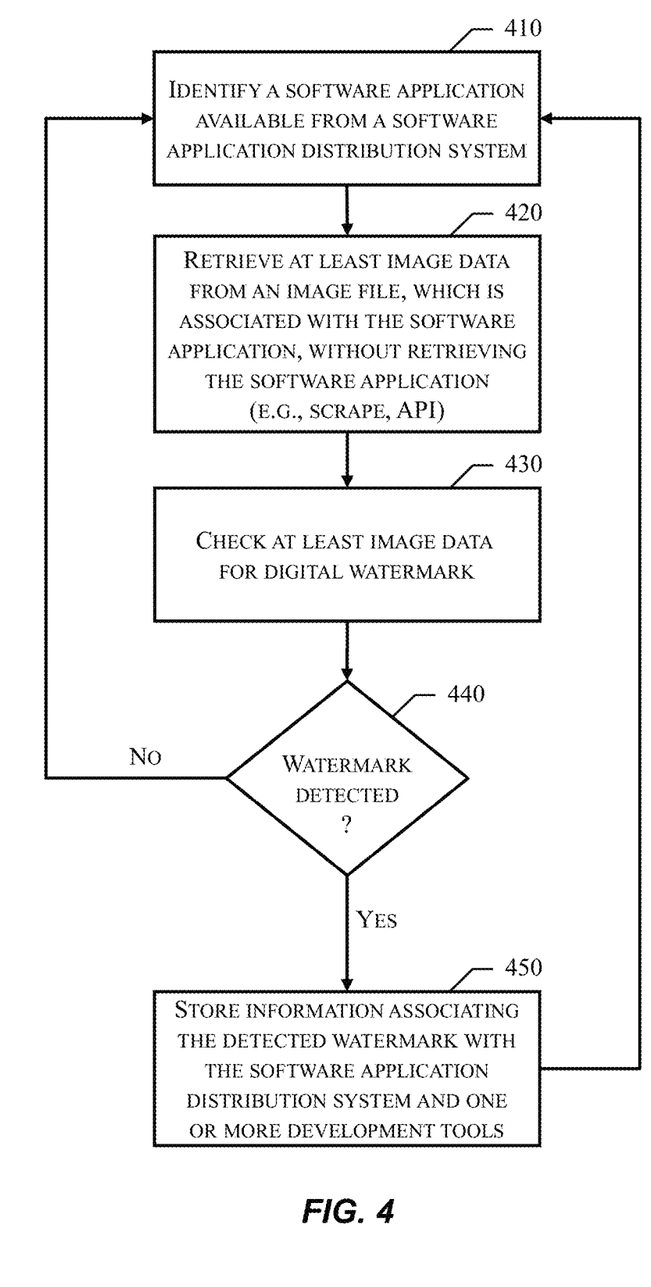
FIG. 4 is a flowchart showing a process of tracking development and distribution of software applications based on digital watermarks detected in image data of image files associated with the software applications.

FIG. 4 is a flowchart showing a process of tracking development and distribution of software applications based on digital watermarks detected in image data of image files associated with the software applications. A software application available from a software application distribution system is identified 410. Image data from an image file, which is associated with the software application, is retrieved 420 from the software application distribution system without retrieving the software application. This can include scraping data from a web page provided by the software application distribution system, using an API of the software application distribution system, or both.

The image data is checked 430 to determine if one or more sought-after watermarks are present in the image data. If no sought-after watermark is detected 440, the process can proceed to look for another software application. If a sought-after watermark is detected 440, then information associating the detected watermark with the software application distribution system from which the identified software application is available is stored 450, and the process can proceed to look for another software application. In addition, the stored information can include information indicating one or more software tools used to develop the software application.

The stored information can include a count of the number of applications that include the watermark. The stored information can include indications of the different types of applications developed using the tool(s) (e.g., games versus other types of applications). Moreover, the stored information can be used to generate reports and for various marketing, sales, or other purposes.

The stored information can be useful for product development, for example by letting companies that provide software tools to application developers determine which kinds of applications the developers are creating. To accomplish this, the watermark identification can be correlated with the application distribution system's categorization of the applications (e.g., Utility, Finance, Games, etc.) Other information regarding applications that do not contain the watermark(s) being detected can also be recorded. This information can be used to determine, for example, whether a particular application publisher has switched from one set of tools, which don't embed a watermark, to another set of tools that do embed a watermark, or vice versa, either over time or at the same time for different types of applications. In some cases, the stored information can also indicate a use of specific tool settings, software version information, operating system (OS) platform(s), various features used by application developers, or a combination of these. Such information can assist in prioritizing future investments in various aspects of a software development tool chain.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the metadata can be added to a video file, which can be considered as an image file. Moreover, in some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Other implementations are also possible. For example, other publicly available data associated with the software application, such audio data, can be modified to include the metadata being added.

What is claimed is:

1. A method performed by data processing apparatus, the method comprising:
    adding, to an image file, metadata indicating a software tool used to develop a software application that is represented by the image; and
    providing the software application and image file to a computer system to cause the software application to be made available for distribution from a software application distribution system comprising at least one server computer including a processor and a memory device;

wherein at least a portion of the image file that includes the added metadata is made available by the software application distribution system for retrieval separate from the software application, the portion of the image file further being made available for retrieval without a restriction that is imposed by the software application distribution system in association with retrieval of the software application, the restriction that is imposed in association with retrieval of the software application restricting a user from retrieving the software application until a condition for lifting the restriction is satisfied, and wherein the added metadata is retrievable from the portion of the image file.

2. The method of claim 1, wherein the adding comprises applying a digital watermark, which includes the metadata, to image data in the image file.

3. The method of claim 2, wherein the image file is an icon image file including multiple icon images that graphically represent the software application, and the applying comprises applying the digital watermark to at least one of the multiple icon images.

4. The method of claim 2, wherein the image file is a screen shot of the software application in operation and is selected from a set of image files that represent the software application, the image file being selected from the set of image files based on a determination that the portion of the image file is to be made available for retrieval from the software application distribution system.

5. The method of claim 2, wherein the image data is from one of multiple discrete sets of image data, and the adding comprises:
   identifying the discrete sets of image data; and
   selecting the one of the discrete sets of image data for the applying.

6. The method of claim 2, comprising:
   receiving, at an application distribution tool, the software application and image file in a package from an application development tool;
   wherein the adding is performed by the application distribution tool on the received package to form a modified package; and
   wherein the providing comprises transmitting the modified package to the software application distribution system comprising the computer system.

7. The method of claim 2, wherein the software tool comprises a packaging tool, the method comprising:
   receiving, at the packaging tool, components of the software application; and
   converting, by the packaging tool, the components of the software application to a package format associated with the software application distribution system;
   wherein the applying comprises applying the digital watermark to the image data in the image file to identify the packaging tool via the applied watermark.

8. The method of claim 7, wherein the packaging tool performs the applying.

9. The method of claim 2, wherein the adding comprises adding to the image file metadata indicating multiple software tools used to develop the software application.

10. The method of claim 2, comprising:
    identifying the software application available from the software application distribution system;
    retrieving the image data including the digital watermark from the software application distribution system without retrieving the software application;
    detecting the digital watermark in the image data; and
    storing information associating the detected watermark with the software application distribution system from which the identified software application is available.

11. A system comprising: one or more processors; and computer-readable storage devices storing instructions that are executable by the one or more processors to perform operations comprising: identifying a software application available from a software application distribution system; retrieving at least image data included in an image file from the software application distribution system without retrieving the software application, the image file representative of the software application, the at least image data being made available for retrieval without a restriction that is imposed by the software application distribution system in association with retrieval of the software application, restricting the software application from being retrieved until a condition for lifting the restriction is satisfied but not restricting the at least image data from being retrieved; detecting a watermark in the image data; and storing information associating the detected watermark with the software application distribution system from which the identified software application is available.

12. The system of claim 11, wherein the retrieving further comprises scraping data from a web page provided by the software application distribution system.

13. The system of claim 11, wherein storing the information associating the detected water mark further comprises storing information indicating a software tool used to develop the software application, wherein the detected watermark includes the information indicating the software tool.

14. The system of claim 11, wherein storing the information associating the detected water mark further comprises storing information indicating multiple software tools used to develop the software application, wherein the detected watermark includes the information indicating the software tools.

15. The system of claim 11, wherein the image file is an icon image file of the software application, and the detected watermark includes information indicating a tool setting, software version information, an OS platform, or a software features used by an application developer.

16. A system comprising:
    an interface to a communication network;
    a data repository; and
    an application development and distribution tracking module implemented by at least a processor and configured to:
    track development and distribution of software applications based on digital watermarks detected in image data of image files that represent a respective software application, the image data being accessible through the interface to the communication network, the image data being provided by one or more software application distribution systems separate from the software applications available from the one or more software application distribution systems, the image data further being provided without restrictions that are imposed by the one or more software application distribution systems in association with retrieval of the software applications, the restrictions that are imposed in association with retrieval of the software applications restricting the software applications from being retrieved until one or more conditions for lifting the restrictions are satisfied but not restricting the image data from being retrieved, and the output of the application development and distribution tracking module recorded in the data repository.

17. The system of claim 16, wherein the application development and distribution tracking module is embodied on a computer system that includes the data repository.

18. The system of claim 17, wherein the interface comprises a network interface card.

19. The system of claim 16, wherein the image files comprise icon image files and are selected from the image files that represent the respective software application, the icon image files being selected from the image files based on a suitability of the icon image files for application of the digital watermarks.

20. The system of claim 16, wherein the image files comprise screen shot image files.

* * * * *

UNITED STATES PATENT AND TRADEMARK OFFICE
CERTIFICATE OF CORRECTION

PATENT NO.         : 8,972,925 B2                                  Page 1 of 1
APPLICATION NO.    : 13/118230
DATED              : March 3, 2015
INVENTOR(S)        : Goldman et al.

It is certified that error appears in the above-identified patent and that said Letters Patent is hereby corrected as shown below:

In the Claims,

Column 14, Line 20, after "...software application,", before "restricting the soft-", insert -- the restriction --, therefore.

Signed and Sealed this
Eighth Day of September, 2015

Michelle K. Lee
*Director of the United States Patent and Trademark Office*